United States Patent [19]

Steinberg

[11] Patent Number: 5,046,382
[45] Date of Patent: Sep. 10, 1991

[54] CLIPLESS BICYCLE PEDAL SYSTEM

[76] Inventor: John D. Steinberg, 320 Lake St. #304, Huntington Beach, Calif. 92648

[21] Appl. No.: 481,951

[22] Filed: Feb. 20, 1990

[51] Int. Cl.⁵ .............................................. G05G 1/14
[52] U.S. Cl. ..................................... 74/594.6; 36/131
[58] Field of Search ................. 74/594.1, 594.4, 594.6, 74/560; 36/131

[56] References Cited

U.S. PATENT DOCUMENTS

| | | | |
|---|---|---|---|
| 595,388 | 12/1897 | Hanson | 36/131 X |
| 4,640,151 | 2/1987 | Howell | 74/594.6 |
| 4,803,894 | 2/1989 | Howell | 74/594.6 |
| 4,898,063 | 2/1990 | Sampson | 74/594.6 |

FOREIGN PATENT DOCUMENTS

| | | | |
|---|---|---|---|
| 15803 | 9/1980 | European Pat. Off. | 74/594.6 |
| 3149345 | 6/1983 | Fed. Rep. of Germany | 74/594.6 |
| 3426103 | 1/1986 | Fed. Rep. of Germany | 74/594.6 |
| 3724578 | 1/1988 | Fed. Rep. of Germany | 74/594.6 |

*Primary Examiner*—Rodney M. Lindsey
*Attorney, Agent, or Firm*—James E. Hawes; L. Harmon Hook

[57] ABSTRACT

The clipless bicycle pedal system includes two cylinders, one on the bicyclist's shoe, the other on the pedal, which closely interfit with one another, one member having laterally projecting pins, the other including circumferential slots for receiving the laterally projecting pins, there being cam means to assist in interfitting the two members by pressing them together and to permit their separation by rotational movement of one member relative to the other.

19 Claims, 3 Drawing Sheets

CLIPLESS BICYCLE PEDAL SYSTEM

FIELD OF THE INVENTION

The present invention broadly relates to a mechanism for removably attaching one object to another, particularly for attaching the shoe of a bicycle rider to a bicycle pedal.

BACKGROUND

In order to most efficiently apply force to the pedal of a bicycle, it is necessary to attach the rider's foot securely so that, in addition to applying force over the downward portion of the pedal stroke, the rider can pull up and back over the other portions of the circle described by the pedal.

Until the early 1980s, there was in common use only one method of securely attaching a bicycle rider's foot to a bicycle pedal: toe clips and straps combined with cleated shoes. In general terms, this system consists of two parts. The first is a cleat bolted to the bottom of a cycling shoe through slotted holes in the cleat allowing varying degrees of static fore-and aft and rotational adjustment, and which includes a deep narrow groove on its lower surface. This groove mates to a vertical metal plate attached to the pedal which, like the groove, is perpendicular to the long dimension of the foot. The second part of the system consists of a metal or plastic clip which attaches at one end to the front of the pedal, wraps around the front and top of the shoe and terminates in one or two loops through which a strap may pass. The toe strap wraps around the foot and through both the loop(s) at the end of the clip and through the pedal itself. The strap is secured and adjusted in tension by means of a spring-tensioned adjuster at one end.

The traditional toe clips and straps are fairly effective in accomplishing the purpose of attaching the rider's foot to the pedal: the cleat securely positions the shoe relative to the pedal in the fore-and-aft plane, while the strap secures the foot relative to the pedal in the vertical and side-to-side planes. Many traditional pedals have the added advantage of allowing casual use with uncleated shoes, although with reduced efficiency. However, the traditional system has several shortcomings. First, the foot cannot be removed from the pedal without loosening the toe strap, which requires the rider to reach down with a hand, which is inconvenient at best and often dangerous. Second, it does not provide for reliable release in the event of an emergency or crash. Third, the raised cleat, which is generally made of hard plastic, makes the shoe difficult and somewhat dangerous to walk in. Fourth, the traditional pedal is topheavy, and therefore hangs upside down prior to entry, making entry difficult, particularly in situations such as starting from rest while travelling uphill. Finally, the cleat tends to clog with mud and dirt, making use of cleated shoes highly impractical for mountain bikes.

Various systems have been designed and introduced over the past years in an attempt to overcome many, if not all, of the foregoing difficulties. For example, many years ago, a "uniblock" system was introduced that consisted of a cleat with a cylindrical hole; the cleat fitting into a recessed channel provided in the pedal. When appropriately positioned, the hole in the cleat lined up with the pin in the pedal which the rider could force through the hole by hand; the cleat and pedal were locked and unlocked from one another by hand. Not only did this system not provide for a hands free release, it also tended to clog with dirt and mud especially if used off road, and the raised cleat made walking difficult. In addition this system did not provide for dynamic rotational adjustment.

More recently, a "Look" system was introduced which appears to incorporate certain ski binding devices and technology. The Look system provides a cleat bolted to the bicyclist's shoe which is set in a spring loaded mechanism provided on the pedal by setting the toe end of the cleat under a lip on the pedal then rocking the shoe back relative to the pedal to snap the rear end of the cleat into the spring loaded mechanism. While this system permits a hands free release of the shoe from the pedal, the raised cleat makes walking in the shoe impractical. Also the mechanism tends to clog easily with dirt, and the contour and size of the pedal make the pedal difficult to use unless the cleat is fully engaged. Also, the pedal does not present a surface that is compatible with street shoes.

In more recent times, several other "clipless" systems have been offered to bicyclists. Included among them is the "Cyclebinding," system (which in general reversed the Look system, placing a recess in the sole of the shoe and a protruding spring-loaded mechanism on the pedal designed to fit into the recess), the Vortechs system (which provides a cleat with a protruding peg on the shoe, the peg fitting into a hole provided in the pedal) and the "Time" system (which is much like the Look system). Other recent systems have been developed and offered by Sampson, Campaganolo, Aerolite, Adidas, Keywin and MK.

While each of these systems overcome some difficulties and provides some advantages over the traditional bicycle pedal, all but the Cyclebinding comprise a male component attached to the shoe which interfits with a female component attached to the pedal. The raised male component makes walking difficult, while the female component makes the pedal incompatible with street shoes. Of particular concern for mountain bicycling, the male-female interfit is easily rendered inoperable by dirt in all of these system, including the Cyclebinding. Thus, currently there is no truly effective system on the market for attaching a bicycle shoe to a pedal.

Ideally, a system for attaching a shoe to a bicycle pedal should be unaffected by dirt and mud, allow easy and safe hands free entry and exit, release automatically in the event of a crash or other emergency, provide a flat, safe walking surface on the shoe, permit use of the pedal (and bike) with normal shoes, allow effective use of the pedal in situations in which engagement of the mechanism is not yet completed, or proves difficult or undesirable, allow both static and dynamic rotational adjustment of the shoe relative to the pedal, be lightweight, and permit easy disassembly and replacement of worn or stressed parts.

These and other objects of the present invention will be apparent to those skilled in this field from the following detailed description of a preferred embodiment of the present invention.

BRIEF SUMMARY OF THE INVENTION

The clipless bicycle pedal system of the present invention consists basically of two members, a cylindrical member recessed in the rider's shoe and a cylindrical member provided on the bicycle pedal. The shoe member has at least one laterally projecting pin. The pedal member is sized to interfit with the shoe member and includes at least one slot for receiving the laterally projecting pin of the shoe member when the two members have been interfitted. Means are also provided to mechanically cam the pin to permit the interfitting of the members by pressing the members together. Also, means are provided for mechanically camming the pin to allow separation of the two members by rotational movement of one member relative to the other.

Preferably, the members are sized and shaped to snugly interfit with one another; the shoe member is larger than the pedal member, and the shoe member includes two laterally projecting pins positioned to be opposed to one another, and the pedal member includes two opposed slots therein. Also, the members and their elements are constructed to clean the laterally projecting pins as the members are being interfitted. Further, the pedal member is attached to the pedal crank of the bicycle such that the pedal member tends to face upwardly at all rotational positions of the crank. In addition, the cam means of the pedal member preferably includes sloped surfaces at the circumferential ends of the slots in the pedal member to assist in camming the pins out of engagement with the slot, permitting the two members to be separated.

BRIEF DESCRIPTION OF THE DRAWINGS

The invention will be further described in connection with the accompanying drawings in which.

DETAILED DESCRIPTION

In its preferred embodiment, broadly the invention relates to a system for attaching a shoe to a surface such as a bicycle pedal. In order to best accomplish this result, a system should meet all of the criteria previously stated.

Figure 1:
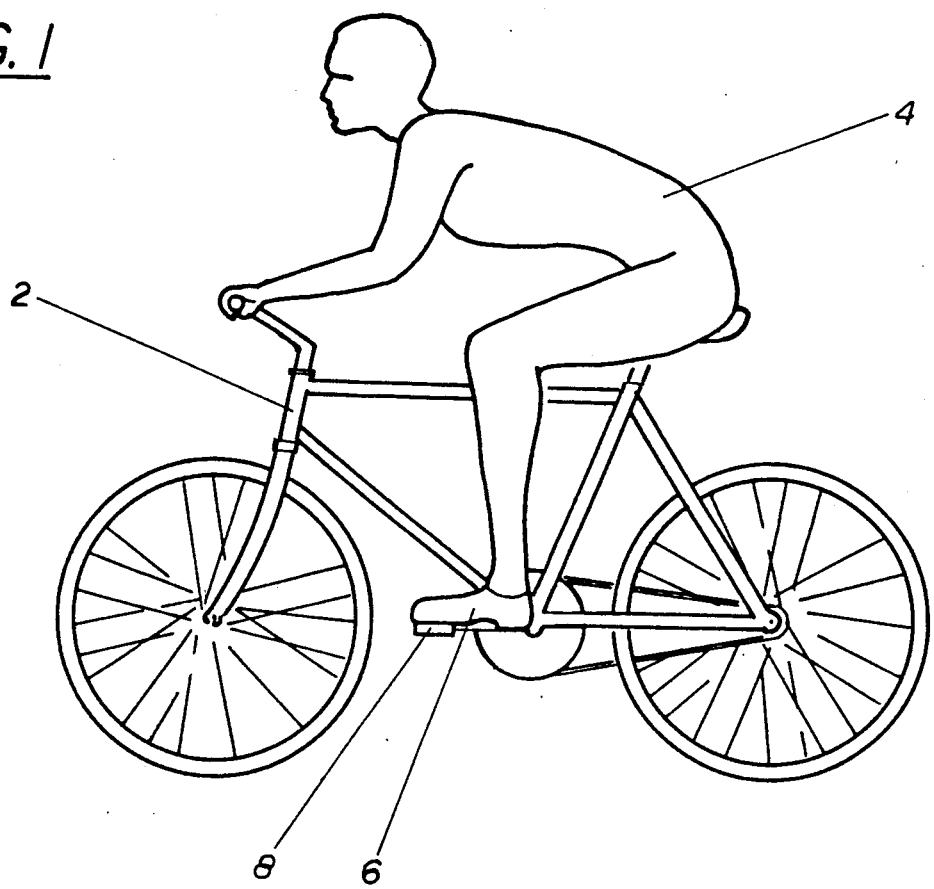
FIG. 1 is an elevational view of a bicycle and bicycle rider with the clipless bicycle pedal of the present invention.
Figure 2:
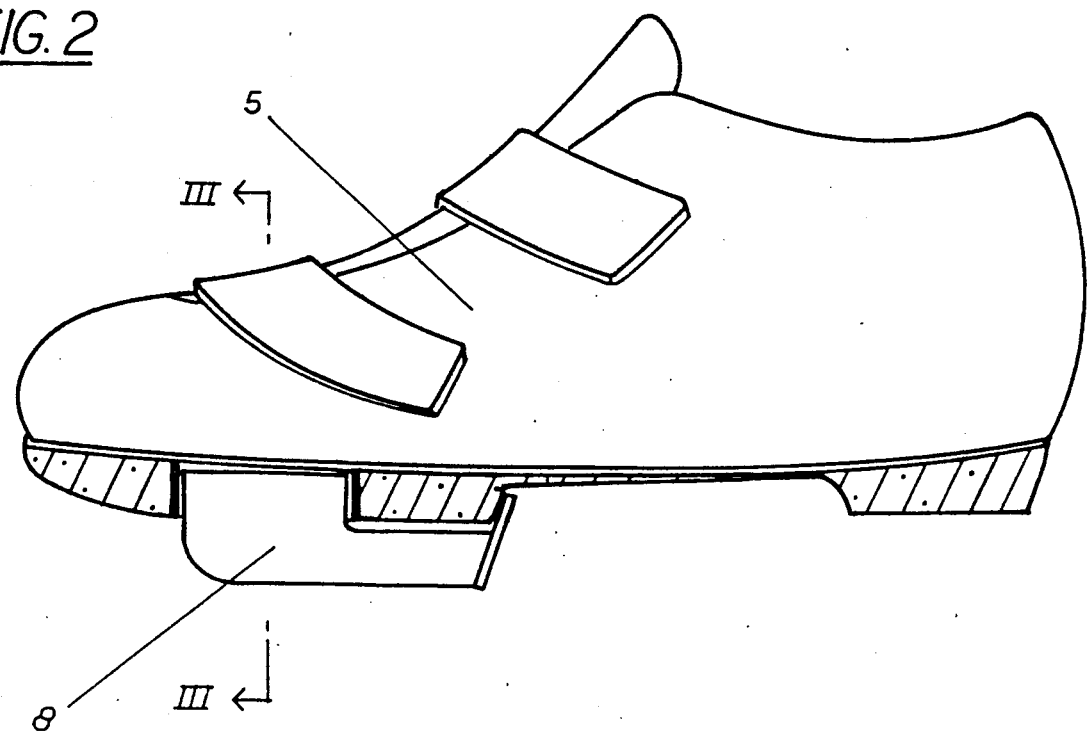
FIG. 2 is an elevational view of a bicycle rider's shoe and a bicycle pedal showing the clipless attachment structure of the present invention.

FIG. 1 shows a bicycle 2 being ridden by a rider 4. The rider's shoe 6 is placed upon the pedal 8. FIG. 2 shows a close-up of the shoe 6 and pedal 8.

Figure 3:
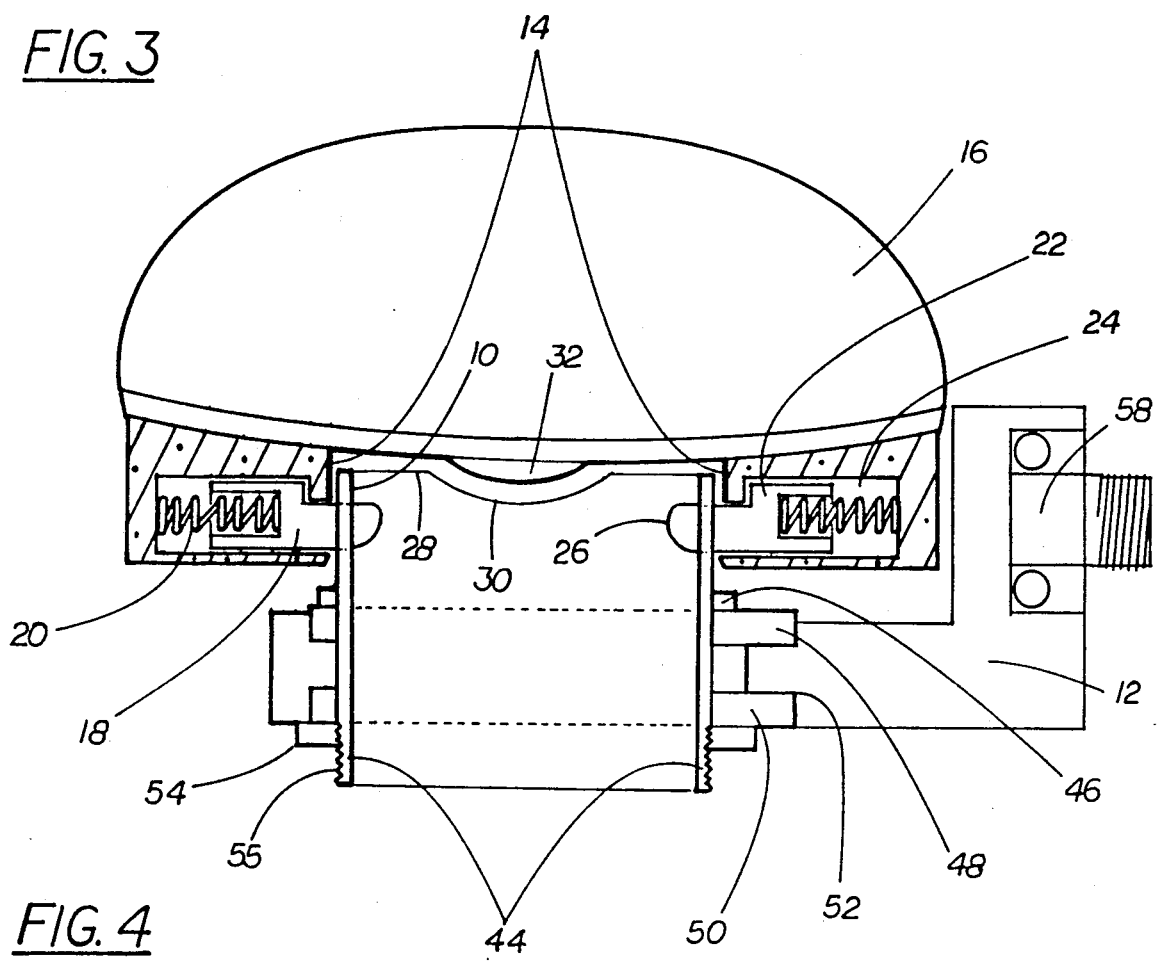
FIG. 3 is a view in vertical cross section taken generally on lines III—III of FIG. 2.

FIG. 3 shows the basic operation and design of the attachment mechanism. A round hollow tube 10 attached to the pedal body 12 fits closely inside a round tube 14 attached to the shoe 16. Rectangular pins 18 are urged by springs 20 to protrude through cutouts in the outer tube and engage rectangular cutouts in the inner tube. The pins are configured to include one or more raised shoulders 22 to restrain the springs from forcing the pins completely out of their compartments 24. When the shoe is placed on top of the pedal, the inner tube nestles inside the outer tube. As the tubes converge, the inner tube bears upon the sloped end surface 26 of the pins and pushes them outward, thereby compressing the springs and cleaning any debris off of the pins. Because the tubes are round, they are free to rotate relative to each other. When the pins are aligned with the slots in the inner tube, the springs urge the pins into engagement with the slots.

When the shoe is locked to the pedal in this fashion, the rider's downward pedaling force is transmitted from the sole of the shoe to the pedal through the top of the inner tube 28. The upward pedaling force is transmitted through the pins to the slots in the inner tube and from it to the pedal.

Release is accomplished by twisting the foot so that the pins no longer align with the slots in the inner tube, allowing the foot to be lifted from the pedal. Release is aided by the inclusion of a valley 30 in the profile of the inner tube which, when the pedal is engaged, corresponds to a raised area 32 on the sole of the shoe inside the outer tube 14. This ridge forces the pedal and shoe to separate when the foot is twisted beyond a given range, whether because of a voluntary release or in the event of a crash.

Figure 4:
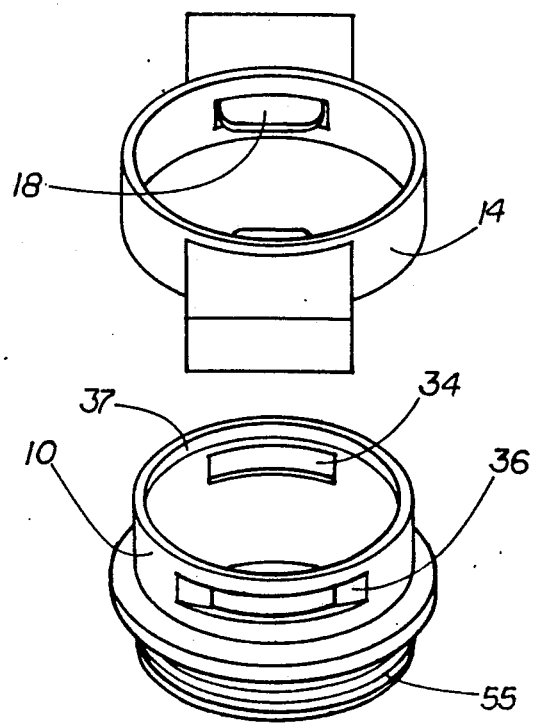
FIG. 4 is an exploded view of the shoe and pedal cylindrical elements of the present invention.

FIG. 4 presents a detailed drawing of the two tubes, with inner tube 10 fitting inside of outer tube 14. The inner tube 10 includes two slots 34. The slots have bevels 36 on the short sides to aid in both locking and release. The top of the inner tube includes a taper 37 on its inside surface to aid in the insertion of the inner tube into the outer tube in the event the outer tube is filled with debris. By making the long dimension of the slots 34 longer than the long dimension of the pins 18, a specified amount of dynamic rotational adjustment is allowed between the rider's shoe and the pedal.

Figure 5:
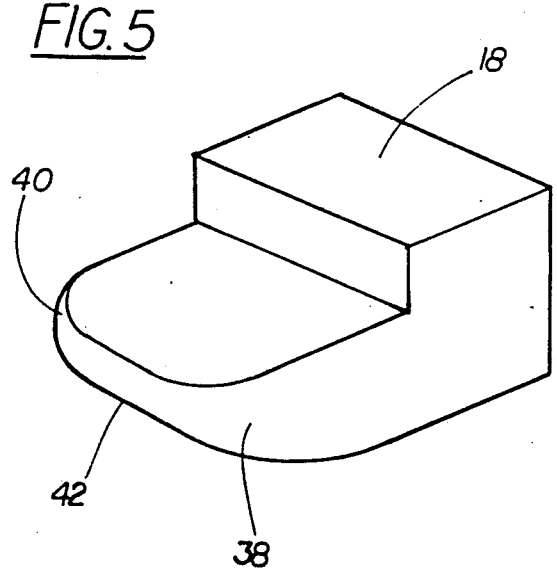
FIG. 5 is a perspective new of the interlocking pin employed in the present invention.

FIG. 5 shows a detail of the pin 18. It includes bevels on its front 38 and back 40 sides and on its lower face 42 to aid both vertical entry and horizontal (twisting) release.

FIG. 3 also shows certain details of the preferred embodiment of the pedal design. The hollow tube 10 is part of an elongated tubular fitting 44. A raised shoulder 46 is permanently attached to the tubular fitting 44. The tube passes through a round washer 48 whose inner diameter describes a circle having a center displaced from the center of the outer diameter. This washer interfits in a recess in the pedal body 12. The pedal body has a hole that is oversize relative to the diameter of the tube. The tube then passes through a second eccentric washer 50 which fits in a recess 52 on the underside of the pedal body. The entire assembly is secured by a large nut 54 which screws onto the threaded end 55 of the tube as shown in FIG. 4. The use of the separate tube and eccentric washers allows 360 degree static rotational adjustment, and a small amount of continuously variable static fore and aft and lateral adjustment of the tube (and thus the rider's shoe) relative to the pedal body.

Figure 6:
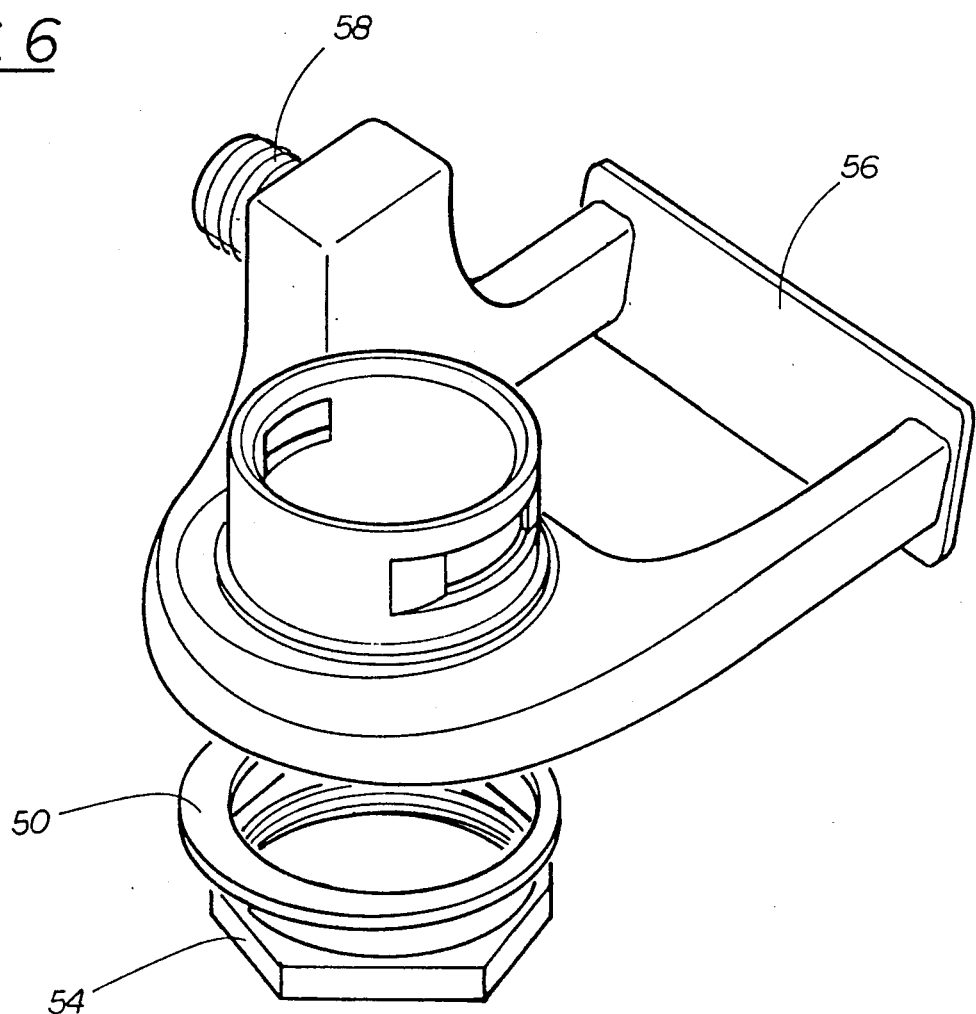
FIG. 6 is an partially exploded view of a bicycle pedal constructed in accordance with the teachings of the present invention.

FIG. 6 shows the presently preferred embodiment of the pedal, with the lower eccentric washer 50 and attachment nut 54 removed for clarity. At the rear of the pedal is a vertical metal plate 56. The plate provides additional contact area for use when the rider does not wish to use the locking mechanism, and, because the top of the plate is in the same plane as the top of the tube, allows safe use of the pedal with street shoes. A single bearing assembly 58 (also shown in FIG. 3) eliminates the need for a bearing shaft running through the body of the pedal and allows the body to be dropped below the centerline of the bearing so that the pedal is self-righting, making entry safer and easier.

Figure 7:
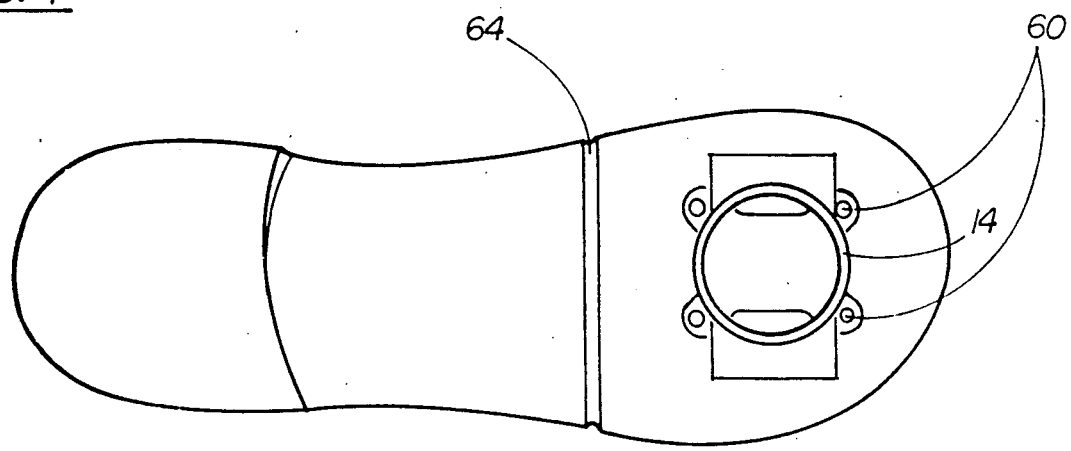
FIG. 7 is a view of the bottom of a bicyclist's shoe incorporating the clipless attachment means of the present invention.

The presently preferred embodiment of the shoe is shown in detail in FIG. 7. The pin and outer tube mechanism 14 is attached to the shoe 16 by four pins 60. It is recessed into the sole of the shoe so that the lower edge of the tube is flush with the walking surface of the shoe. The tube and pin assembly may be removed for replacement or servicing by removing the attachment pins 60. A recess 64 in the sole of the shoe receives the plate 56 at the rear of the pedal and allows the plate to be at the same level as the inner tube, preserving compatibility with normal shoes.

In its preferred embodiment, the invention is an effective mechanism for attaching a cycling shoe to a bicycle pedal. Because of the hollow-tube and pin construction, the mechanism is essentially self-cleaning. Because of the pin design, the round tubes and the self-righting mechanism, entry and release are simple and hands-free. Because of the spring loaded pins and the valley and ridge profile included in the inner tube/shoe interface, the mechanism will automatically release in the event of a fall. Because the pin and outer tube mechanism can be recessed so that the lower edge of the tube is flush with the sole of the shoe, walking in the shoe is easy and safe. Because the inner tube and the top of the rear plate are in the same plane, the pedal may be used with normal shoes. The addition of the rear plate also increases the effective surface area of the pedal, making it feasible to pedal even if the mechanism is not engaged. The adjustability of the inner tube permits static adjustment of the angle and position of the shoe relative to the pedal, allowing for compensation for imperfect biomechanics. The difference between the width of the pins and the width of the slots allows for dynamic rotational adjustment. The design is simple, having only four moving parts, and is quite light. The design of the pedal mechanism allows complete disassembly of the inner tube mechanism by the release of one nut. Thus the mechanism fulfills all of the objectives for a clipless bicycle pedal.

While the presently preferred embodiment of the invention has been shown in the drawings and described in this specification, variations in the construction of the clipless attachment system will be apparent to those skilled in this field. For this reason, the scope of the invention should not be limited to the disclosed embodiment but rather as set forth in the following claims:

I claim:

1. A clipless bicycle pedal system including
   a cylindrical member for a bicycle rider's shoe,
   a cylindrical member for a bicycle pedal, the cylindrical pedal member being sized to interfit with the cylindrical shoe member,
   at least one pin, means attaching said pin to one of said cylindrical members such that the main axis of the pin is transverse to the main axis of the cylindrical members, said attaching means permitting reciprocating movement of the pin relative to the cylindrical members, the other of said cylindrical members including at least one slot therein for receiving the transverse pin of said one member when the two members have been interfitted,
   compressible means urging the pin to a position for engagement with said slot,
   means for mechanically camming the pin to permit interfitting of the members by pressing the members together, and
   means for mechanically camming the pin to allow separation of the members by rotational movement of one member relative to the other.

2. A clipless bicycle pedal system as set forth in claim 1 in which the mechanical camming means to permit separation of the members does not permit their separation by axial movement of one cylindrical member relative to the other cylindrical member.

3. A clipless bicycle pedal system as set forth in claim 1 in which the shoe member and the pedal member are both circular cylindrical members.

4. A clipless bicycle pedal system as set forth in claim 1 in which the cylindrical members are sized to snugly interfit with one another.

5. A clipless bicycle pedal system as set forth in claim 1 including mechanical means provided on at least one of said members for cleaning the pin as the members are being interfitted.

6. A clipless bicycle pedal system as set forth in claim 1 including means for mounting the pedal member to a pedal crank such that the pedal member tends to face upwardly at all rotational positions of the crank.

7. A clipless bicycle pedal system as set forth in claim 1 in which the separation cam means includes sloped surfaces at the circumferential ends of the slot.

8. A clipless bicycle pedal system as set forth in claim 1 in which the bicycle pedal includes a bar spaced from the pedal member, the upper surface of the bar being generally in the same plane as the upper surface of the pedal member to increase the support and bearing area provided by the pedal.

9. A clipless bicycle pedal system as set forth in claim 1 in which said one cylindrical member includes at least two laterally projecting opposed pins, each pin being attached to said one cylindrical member for reciprocating movement; and in which the other said cylindrical member includes at least two laterally opposed slots therein for receiving the laterally projecting pins of said one member when the two members have been interfitted.

10. A clipless bicycle pedal system as set forth in claim 9 in which said mechanical camming means to permit separation of the members does not permit their separation by axial movement of one cylindrical member relative to the other cylindrical member.

11. A clipless bicycle pedal system as set forth in claim 10 in which the shoe member and the pedal member are both circular cylindrical members and in which the cylindrical members are sized to snugly interfit with one another.

12. A clipless bicycle pedal system as set forth in claim 11 in which the mechanically camming means to allow separation of the members by rotational movement includes sloped surfaces at the circumferential ends of the slots of the other of said cylindrical members, the system also including mechanical means provided on one of said cylindrical members for cleaning said pins as the members are being interfitted.

13. A clipless bicycle pedal system as set forth in claim 12 in which the cylindrical member for the bicycle rider's shoe incorporates said laterally projecting pins, and in which the cylindrical member of the bicycle pedal incorporates said laterally opposed slots for receiving said laterally projecting pins when the two members have been interfitted.

14. A bicycle rider's shoe having a shoe assembly for use in a clipless system for attaching a bicycle rider's shoe to a bicycle pedal, the pedal having a cylindrical member including at least one slot therein, said shoe assembly comprising:
- a cylindrical member sized to interfit with the cylindrical pedal member;
- at least one pin sized to be received in said slot;
- means attaching said pin to said shoe cylindrical member for reciprocating movement such that the main axis of the pin is transverse to the axis of the cylinder;
- compressible means urging the pin to a position for engagement with said slot,
- means for mechanically camming the pin to permit interfitting of the members by pressing the members together, and means for mechanically camming the pin to allow the separation of the members by rotational movement of one member relative to the other.

15. An assembly as set forth in claim 14 in which the mechanical camming means to permit separation of the members does not permit their separation by axial movement of one cylindrical member relative to the other.

16. A bicycle pedal for use in a clipless system for attaching a bicycle rider's shoe and pedal together in which the rider's shoe includes a cylindrical member having at least one laterally projecting and reciprocating pin therein, the bicycle pedal including:
- a cylindrical member sized to interfit with the cylindrical shoe member,
- the cylindrical pedal member including at least one slot therein for receiving the laterally projecting pin of the shoe member when the members have been interfitted,
- the cylindrical pedal member including means for mechanically camming the pin out of engagement with the slot in the pedal member to allow separation of the members by rotational movement of one member relative to the other.

17. An assembly as set forth in claim 16 in which the mechanical camming means to permit separation of the members does not permit their separation by axial movement of one cylindrical member relative to the other cylindrical member.

18. An assembly as set forth in claim 17 in which the pedal also includes a bar spaced from the cylindrical member, the upper surface of the bar being generally in the same plane as the upper surface of the pedal member to increase the support and bearing area provided by the pedal.

19. An assembly as set forth in claim 18 including means for mounting the pedal member to a pedal crank such that the pedal member tends to face upwardly at all rotational positions of the crank.

* * * * *